United States Patent Office 3,320,455
Patented May 16, 1967

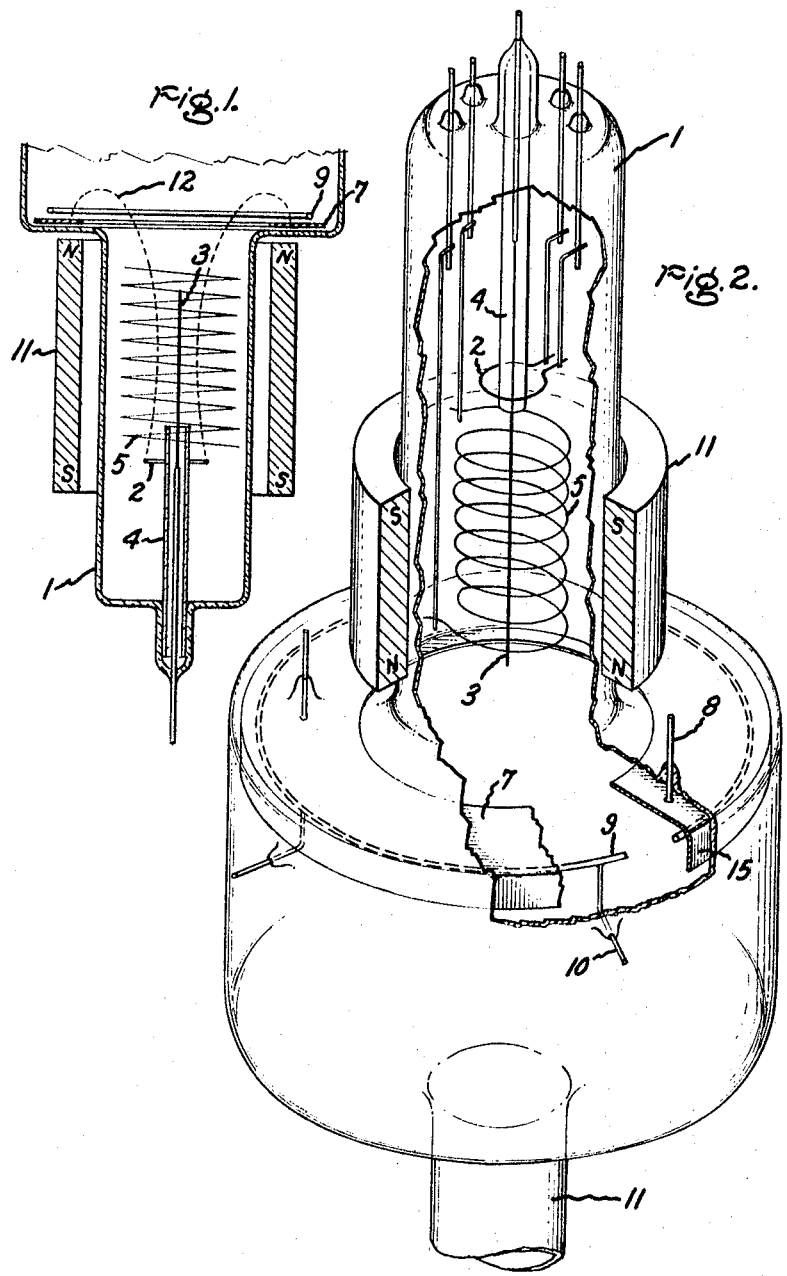

3,320,455
IONIZATION VACUUM GAUGE HAVING
X-RAY SHIELDING MEANS
Nathan Rey Whetten, Burnt Hills, and John M. Houston, Schenectady, N.Y., assignors to General Electric Company, a corporation of New York
Filed Apr. 22, 1966, Ser. No. 544,431
7 Claims. (Cl. 313—7)

ABSTRACT OF THE DISCLOSURE

An ion gauge for measuring vacua prevents electrons produced at the gauge filament from reaching the gauge grids to produce extraneous ions and X-radiation by attracting the electrons to an annular electrode positioned so that it is out of line-of-sight with the gauge's ion collector, thus leaving the collector current unaffected. An axial magnetic field has a strength correlated with the collector electrode voltage so that electrons follow curved magnetic field lines and strike the collector electrode on its side remote from the ion collector so that it is impossible for X-rays to reach the ion collector. An additional electrode is provided to collect positive ions produced by impact of electrons on the remote surface of the electron collecting electrode.

---

Our invention relates to vacuum gauge and in particular to a gauge for measuring very low gas pressures such as those within evacuated chambers by measurement of an ionization current established within the rarefied atmosphere of the gas.

In the past, ionization vacuum gauges have taken several forms. In one form a cathode provided in the center of the tube is surrounded by an acceleration electrode of wire mesh. External to the acceleration electrode is a plate or ion-collector which is negative with respect to the cathode. The accelerated electrons cause ionization of the gas, the number of ions produced per unit time being proportional to the pressure of the gas within the tube. The ions thus produced are collected by the ion-collector electrode, the current being a measure of a degree of vacuum within the tube.

Another form of ionization vacuum gauge attempts to eliminate the false pressure reading produced from X-rays caused by electrons striking the acceleration electrode. Such X-rays cause emission of electrons from an ion-collector electrode thus producing an indication which is indistinguishable from that produced by ions impinging on the collector electrode. To eliminate such spurious reading, the collector electrode is placed in the center of the tube and assumes the form of a fine wire of conducting material, the cathode being positioned on the outside of the acceleration electrode which surrounds the ion-collector electrode. In such an arrangement, the amount of X-radiation which is intercepted by the ion-collector electrode is made small by making the ion-collector electrode in the form of a thin wire. Thus, whereas in early gauges the minimum measurable pressure was of the order of $1 \times 10^{-8}$ torr because of this X-ray effect, with the latter form the minimum measurable pressure was lowered to the order of $1 \times 10^{-10}$ torr.

Still other forms of ionization vacuum gauges have employed cold-cathode emission and used axial magnetic and radial electric fields to produce a magnetron type of travel for the electrons from the cold cathode to the electron-collecting electrode.

In all such prior ionization vacuum gauges limitations are observed. The first of these is that when electrons strike the electron-collecting electrode they cause X-rays to be emitted which X-rays in turn when they impinge upon an ion-collecting electrode cause photoelectrons to be emitted thus producing a photoelectric current and giving a false pressure indication. The second limitation is that a false positive ion current is measured as part of the pressure when positive ions are emitted from the accelerating grid as the result of electrons from the filament impinging on the grid. These positive ions are accelerated to the axial collector wire to give a false pressure indication.

It is an object of our present invention to provide an improved ionization vacuum gauge in which X-rays established by the striking of electrons on a surface are prevented from reaching the ion-collecting electrode to produce photoelectric currents and false pressure indications.

Another object of our invention is to provide a new and improved ionization vacuum gauge in which there is no direct line of sight between the electron-collecting surface and the ion-collecting electrode.

A still further object of our invention is to provide a new and improved ionization vacuum gauge in which ions produced by the interaction of electrons with the adsorbed gases on the surface of an electron-collecting electrode are prevented from reaching the ion-collecting electrode to produce false pressure indications.

In its broadest aspect, the ionization vacuum gauge of our invention employs a magnetic field to constrain electrons emitted from a thermionic cathode to a curved path such that they do not impinge upon the accelerating electrode but instead are directed to an electron-collecting electrode while ions resulting from electrons striking gas particles are directed to an ion-collecting electrode, the electron-collecting electrode being positioned so that there is no direct line of sight between it and the ion-collecting electrode. In accordance with another aspect of our invention, an additional electrode is positioned adjacent the electron-collecting electrode so that positive ions produced by impact of electrons on the electron-collecting electrode are collected by such additional electrode.

The features of our invention which we desire to protect herein are pointed out with particularity in the appended claims. The invention itself, however, both as to its organization and method of operation, together with the further objects and advantages thereof, may best be understood by reference to the following description taken in connection with the accompanying drawings wherein:

FIGURE 1 is a schematic representation of the ionization vacuum gauge of our invention, and FIGURE 2 is a vertical perspective view partly in section of a gauge embodying our invention.

The gauge of FIGURE 1 comprises a nonmagnetic enclosure 1 which may be formed, for example, of glass, stainless steel or any other suitable nonmagnetic material. Positioned within enclosure 1 is a conventional filamentary wire 2 which may comprise, for example, a tungsten wire or a thoria coated iridium filament and provided with suitable heating potentials by means of input leads from a conventional source of filament voltage (not shown). Supported centrally within envelope 1 is an ion-collecting electrode 3 which comprises a thin conductive wire extending substantially along the vertical axis of envelope 1. The lower portion of wire 3 is surrounded by insulator 4 which extends slightly above filament 2. Encircling and spaced from ion-collecting electrode is an electron accelerating electrode 5 in the form of a spirally wound wire and supplied with operating potentials by suitable leads. Positioned near the end of envelope 1 remote from cathode 2 is an electron-collecting electrode 7 supplied with operating potentials through lead-in conductors 8. Electron-collecting electrode 7 is shown as annular in form and may comprise a washer of any suitable nonmagnetic material such as, for example, tantalum. In accordance with our invention, we also provide an additional ion-collecting electrode 9 which is supported by lead-in wire 10 in a position beyond electron-collecting electrode 7. Surrounding envelope 1 we provide means for establishing a magnetic field along the axis of enclosure 1 and which is illustrated as comprising a permanent magnet 11. While for ease of illustration we have shown magnet 11 as external to enclosure 1, it obviously may be included within the envelope and may also be a conventional solenoid coil provided with suitable energizing voltages.

In the operation of our gauge, electrons from filament 2 are accelerated toward the electron accelerating electrode 5 but are constrained to curved paths along the magnetic field lines imposed by magnet 11 so that the electrons do not reach the accelerating electrode 5. Instead, electrons follow the magnetic field lines and are collected on the upper side of electrode 7, a typical electron trajectory being shown by curve 12. Positive ions produced by impact ionization of gas molecules with the electrons are collected by collector-electrode 3 which in turn is connected to suitable external measuring circuits (not shown), the ion current so measured being proportional to the gas pressure within enclosure 1. Upon striking the upper surface of electrode 7, electrons cause two effects which in prior devices have produced false pressure readings which our invention eliminates. Thus, electrons striking the surface of electrode 7 may produce soft X-rays (which in our gauge are not permitted to reach the ion-collecting electrode) to establish a photoelectric current and false pressure indications found in other gauges. Instead, we constrain the electrons to strike the upper surface of electrode 7 so that any low energy X-rays are directed away from the ion-collecting electrode 3. Electrons striking the surface of electrode 7 may also interact with adsorbed gases on the surface of the electrode to produce ions. To prevent such ions from producing false readings in our gauge, we provide the additional ion-collecting electrode 9 to receive such ions and direct the to a circuit not included in the pressure reading circuit of the gauge.

In the embodiment of our invention illustrated in FIGURE 2, the gauge is connected by a tubulation 11 to the apparatus for which a pressure measurement is desired. The electron-collecting electrode 7 is illustrated as an annular washer having a dependent flange 15, the additional electrode 9 being positioned adjacent flange 15. The glass or insulating stem 4 which surrounds the ion-collecting electrode 3 at one end extends slightly above filament 2 and thus serves to prevent positive ions, such as for example sodium ions, which may be emitted from filament 2 from reaching the ion-collecting electrode 3. Such ions are repulsed from the region of electrode 3 by the positive potential on accelerating electrode 5.

An important feature of our invention is that there is no direct line of sight between the surface of electron-collecting electrode 7 which receives the electrons from cathode 2 and the ion-collecting electrode 3. Since the electron-collecting surface is shielded from the collector electrode 3, X-rays produced by impingement of electrons on the electron-collecting surface of electrode 7 cannot reach the ion-collecting electrode 3.

We have found that suitable operating potentials for a gauge embodying the features of our invention are approximately as follows:

```
                                              Volts
Filament 2 _____  +25
Acceleration electrode 5 _____  +125
Electron-collector 7 _____  +175
Electrode 9 _____  +165
Ion-collector 3 (ground) _____  0
```

In the operation of our gauge we have found that the electron current to the accelerating electrode 5 was a factor of $10^3$ less than the current to the electron-collector 7. This indicates that X-ray limit of our gauge is reduced by $10^3$ and the false ion current from the electrode 5 reduced by $10^3$. As a result, whereas the limit of prior ionization vacuum gauges reading pressures was of the order of $1 \times 10^{-10}$ torr, our gauge permits reading pressures lower than $1 \times 10^{-12}$ torr.

While we have shown a specific embodiment of our invention, it is obvious that certain modifications may be made. Thus, instead of the spirally wound electrode 5, a conductive coating such as a tin oxide coating may be utilized on the wall of envelope 1. A similar coating may be employed to replace electrode 7.

While we have shown particular embodiments of our invention, it will, of course, be understood that we do not wish to be limited thereto since many modifications may be made in the structural arrangement shown and in the instrumentalities employed. We contemplate by the appended claims to cover any such modifications as fall in the true spirit and scope of our invention.

What we claim as new and desire to secure by Letters Patent of the United States is:

1. An ionization vacuum gauge comprising a sealed envelope connected to a vacuum chamber through an opening for admission of gas, the pressure of which is to be measured,
   a thermionic cathode positioned at one end of said envelope,
   an ion-collecting electrode comprising a thin conductive wire extending substantially along the axis of said envelope,
   an acceleration electrode surrounding said ion-collecting electrode and spaced therefrom,
   an electron-collecting electrode positioned at the end of said envelope remote from said cathode and comprising an annular member,
   means for establishing a magnetic field extending along the axis of said envelope and having a strength such that electrons in traveling from said cathode to said electron-collecting electrode follow a curved path and are constrained from reaching said acceleration electrode, and
   means impressing a potential difference between said cathode and electron collecting electrode of a value such that electrons from said cathode follow said curved path to traverse the opening in said annular member and are collected on the surface of said member remote from said cathode.

2. The gauge of claim 1 in which an additional electrode is positioned adjacent said remote surface of said annular member whereby positive ions produced by impact of electrons on said remote surface are collected by said additional electrode.

3. The gauge of claim 1 in which said magnetic means comprises a permanent magnet external to said envelope.

4. The gauge of claim 3 in which said magnet is substantially longitudinally coextensive with said acceleration electrode and said electron-collecting electrode is positioned longitudinally beyond said magnet.

5. The gauge of claim 1 in which the electron-collecting surface is shielded from said ion-collecting electrode.

6. The gauge of claim 2 in which said electron-collecting electrode has a dependent flange and said additional electrode is positioned adjacent said flange.

7. The gauge of claim 1 in which insulating means surrounds the portion of the ion-collecting electrode adjacent said cathode thereby to prevent ions emitted from said cathode from reaching said ion-collecting electrode.

References Cited by the Examiner

UNITED STATES PATENTS

| | | | |
|---|---|---|---|
| 2,884,550 | 4/1959 | Lafferty | 313—7 |
| 3,193,724 | 7/1965 | Klopfer | 315—108 X |
| 3,267,326 | 8/1966 | Hayward | 313—7 X |

JAMES W. LAWRENCE, *Primary Examiner.*

STANLEY D. SCHLOSSER, *Examiner.*